United States Patent
Jeong et al.

(10) Patent No.: US 8,271,283 B2
(45) Date of Patent: Sep. 18, 2012

(54) METHOD AND APPARATUS FOR RECOGNIZING SPEECH BY MEASURING CONFIDENCE LEVELS OF RESPECTIVE FRAMES

(75) Inventors: Jae-hoon Jeong, Yongin-si (KR);
Sang-bae Jeong, Suwon-si (KR);
Jeong-su Kim, Yongin-si (KR);
In-Jeong Choi, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1241 days.

(21) Appl. No.: 11/355,082

(22) Filed: Feb. 16, 2006

(65) Prior Publication Data
US 2006/0190259 A1    Aug. 24, 2006

(30) Foreign Application Priority Data
Feb. 18, 2005    (KR) .................. 10-2005-0013521

(51) Int. Cl.
*G10L 15/04*    (2006.01)
*G10L 15/00*    (2006.01)
(52) U.S. Cl. ....................... 704/254; 704/231
(58) Field of Classification Search ........... 704/231–257
See application file for complete search history.

(56) References Cited

U.S. PATENT DOCUMENTS

| 5,794,198 A * | 8/1998 | Takahashi et al. ............ 704/256 |
| 6,539,353 B1 * | 3/2003 | Jiang et al. .................... 704/254 |
| 6,785,650 B2 | 8/2004 | Basson et al. |
| 2003/0200086 A1 * | 10/2003 | Kawazoe et al. ............. 704/239 |

FOREIGN PATENT DOCUMENTS

| JP | 9-127972 | 5/1997 |
| JP | 2004-526197 | 8/2004 |

* cited by examiner

*Primary Examiner* — Samuel G Neway
(74) *Attorney, Agent, or Firm* — Staas & Halsey LLP

(57) ABSTRACT

Disclosed herein is a method and apparatus to recognize speech by measuring the confidence levels of respective frames. The method includes the operations of obtaining frequency features of a received speech signal for the respective frames having a predetermined length, calculating a keyword model-based likelihood and a filler model-based likelihood for each of the frame, calculating a confidence score based on the two types of likelihoods, and deciding whether the received speech signal corresponds to a keyword or a non-keyword based on the confidence scores. Also, the method includes the operation of transforming the confidence scores by applying transform functions of clusters, which include the confidence scores or are close to the confidence scores, to the confidence scores.

17 Claims, 7 Drawing Sheets

METHOD AND APPARATUS FOR RECOGNIZING SPEECH BY MEASURING CONFIDENCE LEVELS OF RESPECTIVE FRAMES

CROSS-REFERENCE TO RELATED APPLICATION

This application claims benefit from Korean Patent Application No. 10-2005-0013521 and filed on Feb. 18, 2005 in the Korean Intellectual Property Office, the disclosures of which are incorporated herein by reference in their entireties.

BACKGROUND OF THE INVENTION

1. Field of the Invention

The present invention relates generally to a method of recognizing speech and, more particularly, to a method and apparatus for recognizing speech by measuring the confidence levels of respective frames.

2. Description of the Related Art

Machines, home appliances, and automation systems are conventionally controlled using the hands of persons. Recently, control technology using speech is being researched by industry as research into speech recognition is increasing. A system that controls and commands objects in homes, that is, a home network system or a home automation system, provides a Voice User Interface (VUI) function for speech recognition. In order to control home appliances using a natural language in home environments, it is necessary to detect keywords. In this case, keyword detection performance increases in proportion to accurate confidence calculation on keywords. The language of human beings does not coincide with a specific form or specific phonemes and are based on natural language, so that it is necessary to detect keywords from recognized speech.

Conventionally, confidence calculation for a single word or a single subword is performed based on the identical contribution of respective frames. In U.S. Pat. No. 6,539,353 B1, a recognized word is composed of subwords units. The confidence level of a word is determined based on values acquired by applying weights to the confidence levels of subwords that form a word. Different weights are applied to the subwords, so that the confidence level can be acquired in consideration of the influence of each subword on the confidence level. However, in U.S. Pat. No. 6,539,353 B1, the influence of the confidence levels for respective frames based on a subword unit is considered. Even the words of the same subword provide difference pieces information on a frame basis, but uniform calculation is performed without consideration of the difference. Accordingly, it is difficult to improve the accuracy of the measurement of confidence levels.

SUMMARY OF THE INVENTION

Additional aspects and/or advantages of the invention will be set forth in part in the description which follows and, in part, will be apparent from the description, or may be learned by practice of the invention.

Accordingly, the present invention has been made keeping in mind the above problems occurring in the prior art, and the present invention resides in measuring the confidence levels of respective frames in speech recognition.

According to another aspect of the present invention, the Equal Error Rate (EER) of a speech recognizer is reduced by correcting calculation results on confidence levels with weights assigned to respective frames and, therefore, reduce a false response rate.

According to an embodiment of the present invention, a method of recognizing speech is provided by measuring the confidence levels of respective frames, the method including the operations of obtaining the frequency features of a received speech signal for the respective frames having a predetermined length; calculating a keyword model-based likelihood and a filler model-based likelihood for each of the frames; calculating a confidence score based on the two types of likelihoods; and deciding whether the received speech signal corresponds to a keyword or a non-keyword based on the confidence scores.

In addition the present invention provides an apparatus for recognizing speech by measuring the confidence levels of respective frames, the apparatus including a keyword modeling unit for calculating keyword model-based likelihoods using the frame-based feature vectors of a received speech signal; a filler modeling unit for calculating filler model-based likelihoods using the frame-based feature vectors; and a decision unit for deciding whether the received speech signal is a keyword or a non-keyword, based on confidence scores calculated using the keyword model-based likelihoods and the filler model-based likelihoods.

In addition the present invention provides a method of recognizing speech by measuring confidence levels of respective frames, the method comprising the operations of obtaining frequency features of a received speech signal for the respective frames having a predetermined length; calculating a keyword model-based likelihood and a filler model-based likelihood for each of the frames; calculating a confidence score based on the two types of likelihoods; and transforming the confidence scores by applying transform functions of clusters, which include the confidence scores or are close to the confidence scores; deciding whether the received speech signal corresponds to a keyword or a non-keyword based on the confidence scores.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
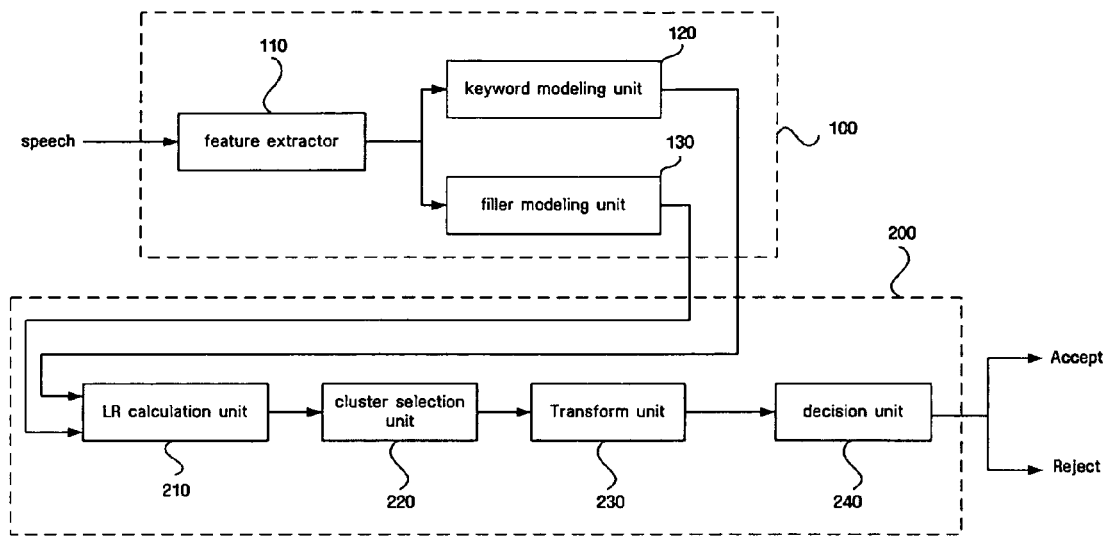
FIG. 1 is a diagram showing the construction of an apparatus for recognizing speech according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Prior to the description, the meanings of the terms used in the present specification are given in brief. At this point, it should be noted that the description of terms is used to help the understanding of the present specification, but is not to be used to limit the technical spirit of the present invention in the case where the limitative details of the present invention are not specified.

Null Hypothesis and Alternative Hypothesis

The term "null hypothesis" refers to a hypothesis that is accepted if there is not sufficiently strong evidence to disprove it. In contrast, the term "alternative hypothesis" refers to a hypothesis that is accepted if there is strong evidence to disprove the null hypothesis. The null hypothesis and the alternative hypothesis are contrary to each other. In the present specification, the null hypothesis is represented as $H_0$, and the alternative hypothesis is represented as $H_1$.

Filler Model

The term "filler model" refers to a model for finding non-keywords. There exists a method of performing modeling on individual non-keywords or on all non-keywords. The weight of likelihoods measured using a filler model is assigned to non-keywords and, therefore, it can be determined whether the non-keywords correspond to the filler model. It can be determined whether a recognized word is a keyword according to the results of likelihoods measured based on a filler model and a keyword model.

Hidden Markov Model (HMM)

The HMM is the most widely used method for speech recognition. The HMM performs speech recognition in such a manner that it is assumed that a speech signal is calculated using a Markov model, the parameters of the model are estimated at a learning operation, and the model that is most suitable for unknown input speech is found by a speech recognizer using the estimated parameters. A model used for speech recognition may be a phoneme or a word itself. The Markov model is represented by a Finite state machine (FSM) that changes its state each time.

Likelihood

A likelihood is a probability that indicates to what extent a recognized frame, word and subword is similar to a keyword model or a filler model. For example, a probability for the degree of similarity to a specific word that belongs to a keyword model may be a likelihood for a corresponding keyword model. Furthermore, in the case where a specific word of the keyword model is composed of subwords, keyword model-based likelihoods and filler model-based likelihoods can be calculated after the likelihoods or respective subwords are obtained. Furthermore, the subwords are further subdivided into states or frames, likelihoods are calculated according to the states or the frames and, therefore, the likelihoods of recognized speech can be calculated through the combination of the calculated results. In the present specification, likelihoods are calculated based on information about frames or states that is detailed information constituting the subwords. In the filler model, likelihoods can also be obtained based on information about frames or states that constitute the filler model.

The term "~unit" used in the present embodiment, including the term "~module" or "~table", refers to hardware, such as a Field-Programmable Gate Array (FPGA) or an Application-Specific Integrated Circuit (ASIC). The respective modules perform specific functions. The components and functions provided within the modules may be combined into a smaller number of components and modules, or may be divided into additional components and modules. Furthermore, the components and modules may be implemented to operate one or more Central Processing Units (CPUs) within a device or a security multimedia card.

FIG. 1 is a diagram showing the construction of an apparatus for recognizing speech according to an embodiment of the present invention. The apparatus for recognizing speech includes a speech recognition unit 100 and a confidence measurement unit 200. The speech recognition unit 100 includes a feature extractor 110 for extracting features from speech, a keyword modeling unit 120, and a filler modeling unit 130. The feature extractor 110 generates feature vectors by calculating the frequency characteristics of a speech signal for respective frames. Furthermore, the feature extractor 110 includes a keyword modeling unit 120 for calculating the keyword model-based likelihoods of the feature vectors, and a filler modeling unit 130 for calculating the filler model-based likelihoods of the features.

The keyword modeling unit 120 compares the extracted features with a keyword and calculates likelihoods, each of which indicates the degree of similarity to the keyword. The filler modeling unit 130 also calculates the likelihoods of the extracted features. The filler modeling unit 130 can assign scores through various filler networks. The filler networks includes a monophone filler network that performs determination using only a single phoneme, a biphone filler network that is constructed by considering a relationship between a phoneme, for which it is desired to make a decision, and a previously phoneme or a subsequent phoneme, and a triphone filler network that is constructed by considering both previous and subsequent phonemes.

A Likelihood Ratio (LR) for each frame is calculated in an LR calculation unit 210 via the keyword modeling unit 120 and the filler modeling unit 130. In this case, the LR refers to a ratio of $p(x_k|H_0)$ and $p(x_k|H_1)$. $P(x_k|H_0)$ is a keyword model-based likelihood of $x_k$ that is the kth frame feature vector of recognized speech, and $p(x_k|H_1)$ is a filler model-based likelihood of $x_k$ that is the kth frame feature vector of recognized speech. The calculated results become LRs or confidence scores. A cluster selection unit 220 searches for clusters closest to the confidence scores. A transform unit 230 transforms the confidence scores using the transform functions of corresponding clusters according to cluster selected by the cluster selection unit 220, and then obtains confidence scores for respective frames. The decision unit 240 decides whether the recognized speech belongs to the keyword model or not. The recognized speech is called In Vocabulary (IV) if it belongs to the keyword model, and the recognized speech is called Out Of Vocabulary (OOV) if it does not belong to the keyword model. The parts that have been determined to be OOV speech are not processed in the case where the meaning of speech or a corresponding command is searched for. Accordingly, when insignificant speech or noise enters, it is determined to be OOV and the processing thereof is not performed.

In an embodiment of the present invention, the LR calculation unit 210 is a frame-based LR calculation unit.

Figure 2:
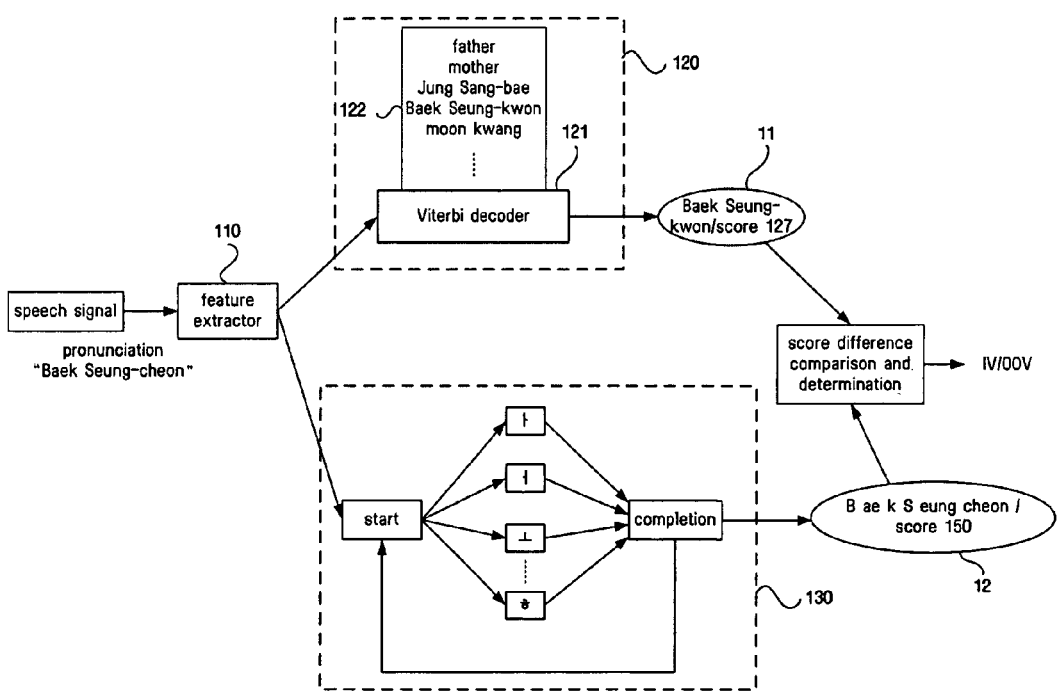
FIG. 2 is a diagram showing an example of a process in which a keyword model and a filler model recognize and score a speech signal.

FIG. 2 is a diagram showing an example of a process in which a keyword model and a filler model recognize and score a speech signal.

When a speech signal "Baek Seung-cheon" is input, the feature extractor 110 extracts features for respective frames from the speech signal. The extracted features are provided to both the keyword modeling unit 120 and the filler modeling unit 130. The keyword modeling unit 120 includes a Viterbi decoder 121 and a keyword database 122. The Viterbi decoder 121 matches the extracted features to the keywords of the keyword database 122 and calculates matched results. The Viterbi decoder, which is widely used for speech recognition, performs a task for matching the feature vectors and keyword models. A result 11 is acquired such that the keyword, "Baek Seung-cheon" has a likelihood score of "127".

Meanwhile, the filler modeling unit 130 calculates the likelihood of noise or a non-keyword to filter out the noise or the non-keyword from the recognized speech. In the embodiment of FIG. 2, the filler modeling unit 130 recognizes the received speech signal on a phoneme basis. Furthermore, the filler modeling unit 130 uses a monophone filler network, and uses it repeatedly until the input of speech is terminated. Besides the monophone filler network, the various filler networks may be used as described above. As the result 12 of the recognition, the filler modeling unit 130 calculates a likelihood score of "150".

A frame can refer to a single state. The single state refers to a state in a finite state machine, such as the Hidden Markov Model (HMM). The frame and the state may be configured to correspond to one to one, and a single state may be configured to correspond to a plurality of frames. Furthermore, a single frame is configured to represent a single state or part of the state.

The results calculated by the keyword modeling unit 120 and the filler modeling unit 130 are results acquired by summing up scores for all the frames. However, in the process of summing up scores for all the frames, contribution to recognition may differ for respective frames. Accordingly, it is necessary to transform scores for respective frames and sum up the transformed scores prior to generation of the results 11 and 12. Calculation process for respective frames and operation in the LR calculation 210 unit are described with reference to FIG. 3.

Figure 3:
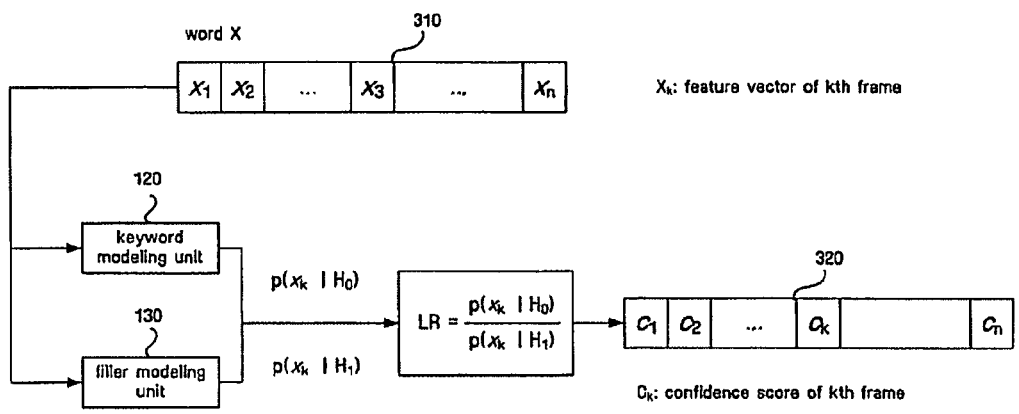
FIG. 3 is a diagram showing an example of a process of measuring confidence scores and ratios for respective frames in an LR calculation unit according to an embodiment of the present invention.

FIG. 3 is a diagram showing an example of a process of measuring confidence scores and ratios for respective frames in an LR calculation unit according to an embodiment of the present invention.

Reference numeral 310 denotes a set of feature vectors for recognized speech, which are constructed for respective frames. $x_k$ is the feature vector of a kth frame. For each feature vector, two types of likelihoods are provided through the keyword modeling unit 120 and the filler modeling unit 130. One type of likelihood calculated by the keyword modeling unit 120 is $p(x_k|H_0)$, and another type of likelihood calculated by the filler modeling unit 130 is $p(x_k|H_1)$. $H_0$ denotes that speech has been exactly recognized and exists in the keyword model, and H1 denotes that recognized speech does not exist in the keyword model and corresponds to the filler model. When the ratio of the two type likelihoods is defined as an LR, it can be determined which cluster each frame corresponds to based on the LR. There exists a plurality of clusters that are classified according to the ratio of the two types of likelihoods, and respective transform functions for transforming confidence scores again may be provided according to the clusters. Such transform functions are provided to the clusters, respectively, so that frames to be emphasized and frames to be attenuated are transformed and it can be determined whether the recognized speech corresponds to the keyword model.

Figure 4:
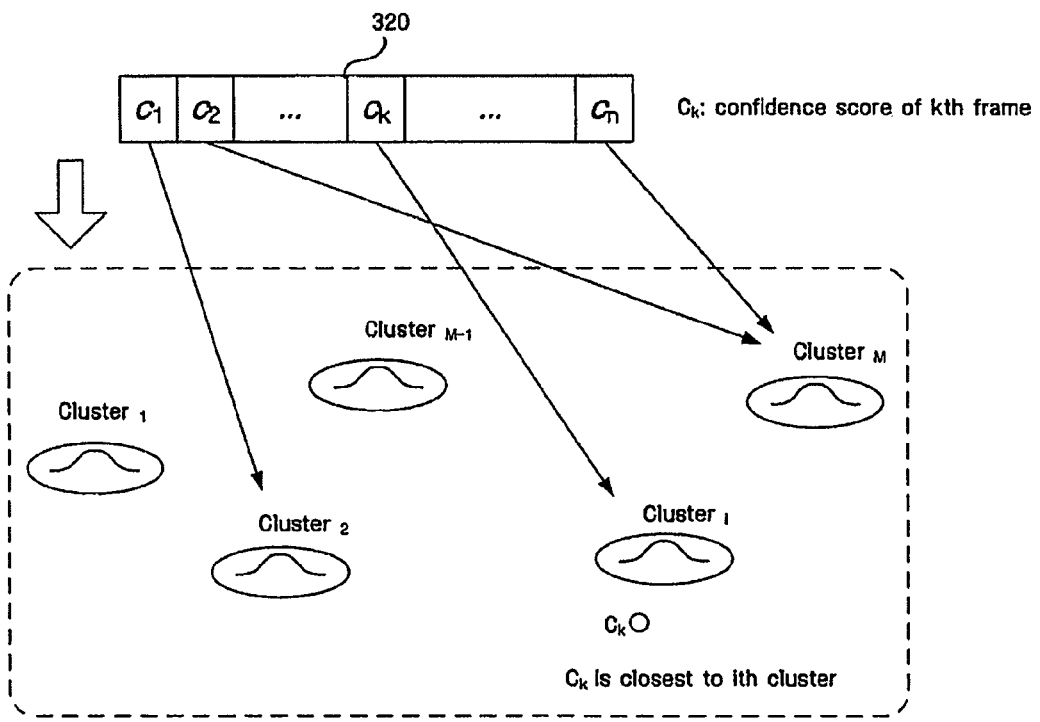
FIG. 4 is a diagram showing an example of a process of selecting a cluster according to a likelihood ratio for each frame in a cluster selection unit according to an embodiment of the present invention.

FIG. 4 is a diagram showing an example of a process of selecting a cluster according to an LR for each frame in the cluster selection unit according to an embodiment of the present invention.

As shown in FIG. 4, clusters are clustered depending on predetermined ranges of LRs. Accordingly, a cluster that is closest to the LR of each frame exists. When a confidence score resulting from the LR of the kth frame is defined as $C_k$, there exists a corresponding cluster closest to the confidence score of each frame in FIG. 4. $C_1$ is closest to cluster$_2$, $C_2$ and $C_n$ are closest to cluster$_M$, and $C_k$ is closest to cluster$_i$. When it is determined which cluster each frame corresponds to, a transform function for each cluster is applied. Clusters may be acquired through general clustering or may be acquired using a subword model or states forming the subword model.

Figure 5:
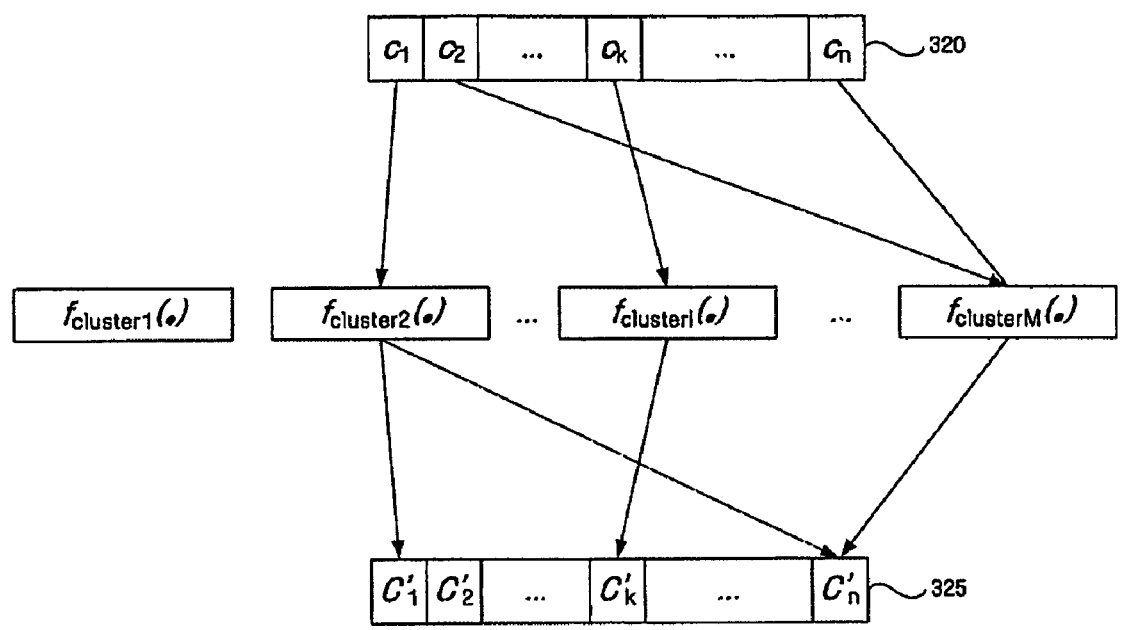
FIG. 5 is a diagram showing an example of a process of transforming likelihood ratios according to cluster, in accordance with an embodiment of the present invention.

FIG. 5 is a diagram showing an example of a process of transforming LRs according to cluster, in accordance with an embodiment of the present invention.

Frame-based LRs 320 includes $C_1, C_2, \ldots, C_n$. $C_1$ corresponds to cluster$_2$, $C_2$ to cluster$_M$, $C_k$ to cluster$_i$, and $C_n$ to cluster$_M$. Accordingly, confidence scores obtained by using the transform functions of corresponding clusters are indicated by reference numeral 325.

The transform functions extend the characteristics of the ratios of the likelihoods, which are calculated through the keyword model, and the likelihoods, which are calculated through the filler model, thus increasing a confidence level for determining whether a word exists within the keyword model. The word that belongs to the keyword model is defined as IV, the word that does not belong to the keyword mode is defined as OOV, as described above.

An example of the transform function is as follows: also, nonlinear function can be used.

$$f_{cluster_i}(c_k) = \alpha_{cluster_i} \cdot c_k + \beta_{cluster_i} \quad (1)$$

where $C_k$, which is the LR of a kth frame, corresponds to an ith cluster cluster$_i$. The parameters $\alpha_{cluster_i}$ and $\beta_{cluster_i}$ of a transform function that transforms the LR belonging to the ith cluster cluster$_i$ are determined such that the difference in average between IV and OOV is large and the respective variance values thereof are small. Accordingly, a reference Equation for acquiring these parameters is as follows:

$$J = \frac{\sigma_{IV}^2 + \sigma_{OOV}^2}{(\mu_{IV} - \mu_{OOV})^2} \quad (2)$$

The values of the parameters $\alpha_{cluster_i}$ and $\beta_{cluster_i}$ are obtained such that $(\mu_{IV} - \mu_{OOV})^2$, which is the difference of an average between IV and OOV, is large, and $\sigma_{IV}^2 + \sigma_{OOV}^2$, which are the variance values thereof, is small, thus lowering the value of "J".

For a learning method for obtaining these values, a steepest descent algorithm is used as an embodiment of the present invention. The steepest descent algorithm employs a backpropagation algorithm, and is used to extract the principle features of input data. The backpropagation algorithm is an algorithm that performs calculation with reference to previous resulting values. Besides the steepest descent algorithm, a method, such as dynamic tunneling, may be used as the backpropagation algorithm, and other various methods for selecting the parameters of a transform function may be employed.

An example of a learning process of setting the parameters of a transform function to lower the value of "J" is as follows:

$$\alpha_{m+1}^i = \alpha_m^i - \eta \cdot \frac{\partial J}{\partial \alpha_m^i} \qquad (3)$$

$$\beta_{m+1}^i = \beta_m^i - \eta \cdot \frac{\partial J}{\partial \beta_m^i}$$

Equation 3 is an equation for obtaining the parameters of a transform function. α and β are the parameters of the transform function, and i denotes the parameter of cluster$_i$. Furthermore, m denotes a currently selected parameter, and m+1 denotes a next parameter for which a newly optimized value is desired to be obtained based on the currently selected parameter. Accordingly, convergence on an optimized parameter can be achieved through a plurality of learning processes. η is a constant. A process in which $\alpha_1$ and $\beta_1$ become $\alpha_n$ and $\beta_n$ through a learning process can be viewed from the graph of FIG. 6.

Figure 6:
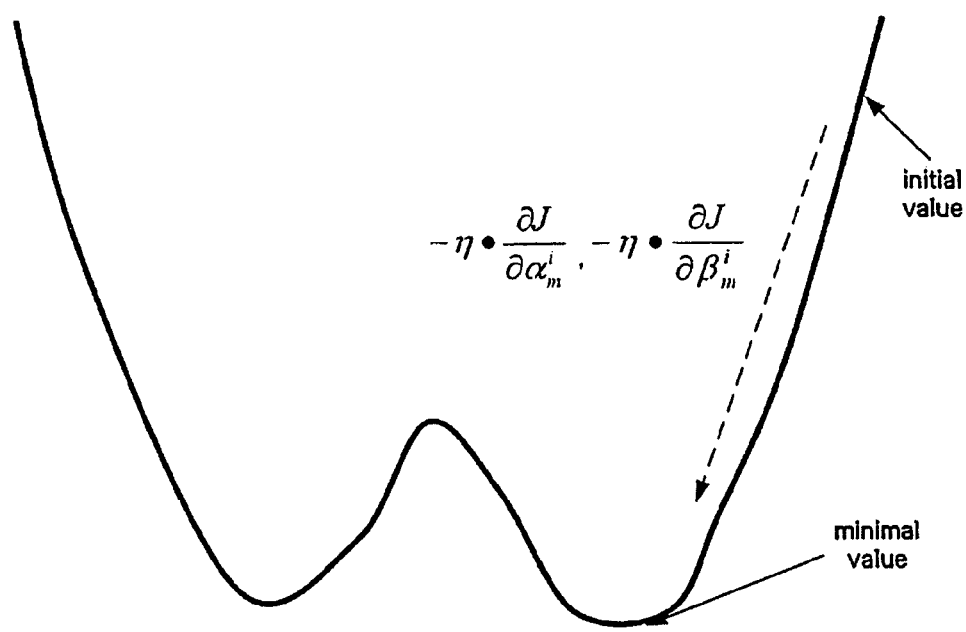
FIG. 6 is a graph showing a process of optimizing a transform function through multiple learnings in accordance with an embodiment of the present invention.

FIG. 6 is a graph showing a process of optimizing a transform function through multiple learnings in accordance with an embodiment of the present invention. α and β at the time when a differentiation result is 0 are set for the parameters of the transform function. When α and β are initially obtained, the value of "J" is high. However, the value of "J" can be lowered to a minimal point as m, which is the number of learnings, increases. In this case, the values of α and β can be used for the transform function of a cluster.

Figure 7:
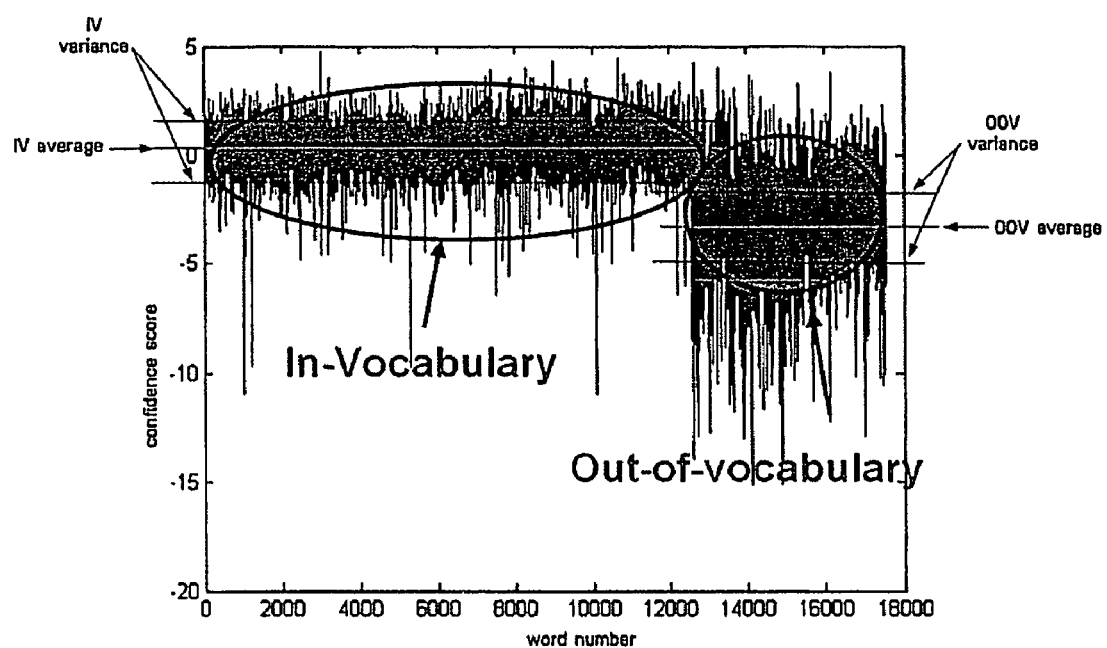
FIG. 7 is a graph showing the confidence score distributions of IV and OOV according to an embodiment of the present invention.

FIG. 7 is a graph showing the confidence score distributions of IV and OOV according to an embodiment of the present invention. It can be seen that there exists a portion at which the boundaries of IV and OOV overlap each other. Transform frames are used, so that the difference between averages of IV and OOV becomes large and the respective variances thereof become small. Accordingly, IV and OOV are more obviously distinguished from each other.

$$Skewness_w = \frac{\sum_{k=1}^{N_w}\left(c_k' - \sum_{i=1}^{N_w} c_i'\right)^3}{\left(\sum_{k=1}^{N_w}\left(c_k' - \sum_{i=1}^{N_w} c_i'\right)^2\right)^{\frac{3}{2}}} \qquad (4)$$

CS(w) denotes the confidence score of a word w. However, when the distribution of confidence scores of respective frames within a single word is plotted, the extents of being biased of IV words and OOV words differ. In the case of the IV words, there are many frames having high confidence scores. In the case of the OOV words, there are many frames having relatively low confidence scores. The above-described extent is called skewness, and confidence scores can be more exactly corrected using the different skewness characteristics of IV and OOV. Confidence scores can be corrected through an operation of subtracting a result, which is acquired by multiplying skewness by ϵ, from CS(w). An example of obtaining skewness is expressed by Equation 4.

In Equation 4, $C'_k$, which is a confidence score for the kth of the frames constituting the word w, is a result that is obtained by transformation using a transform function. In Equation 4, the skewness is obtained based on result A, which is obtained in such a way as to cube the sum of the squares of the differences between all the frames constituting the word w and find the square root of the cubed sum, and result B, which is the sum of the cubes of the differences between all the frames. The case where the skewness is 0 indicates that CS(w) is symmetrical to the average. In order to calculate the confidence scores of a corresponding word, the skewness, which is obtained by Equation 4, is corrected as follows:

$$CS(w)=CS(w)-\epsilon \times Skewness_w \qquad (5)$$

When the confidence score is obtained through skewness correction, speech can be recognized in such a manner that the corresponding word is determined to be IV in the case where the obtained score exceeds a predetermined value, and otherwise the corresponding word is determined to be OOV.

Experimental results performed using the method presented in the present specification are described below. In order to construct speech recognition data, the voices of one hundred men and women (the voices of fifty men and fifty women) were recognized, and a database, including two ten thousands of utterances, was established. The interval of frames used for extracting features was set to 30 ms, and the overlapping interval between frames was set to 20 ms. Furthermore, in order to extract features, Mel Frequency Cepstral Coefficients (MFCCs) was used. Feature vector coeffcients actually used are composed of thirteen MFCC cepstrums, thirteen delta (Δ) cepstrums, and thirteen delta delta (ΔΔ) cepstrums, according to an embodiment of the present invention. It is also understood that LPC cepstrums, PLP cepstrums, or filter banks may be used.

A method of obtaining MFCCs is described below. A speech signal passes through an anti-aliasing filter, and is then converted into a digital signal x(n) through Analog/Digital (A/D) conversion. The digital signal passes through a preemphasis filter having high-pass characteristics. The reasons why this filter is used are as follows: first, high-pass filtering is used to perform modeling on the frequency characteristics of the external ear/middle ear of human beings. This compensates for an attenuation of 20 dB/decade due to the emission from the lips, so that only vocal characteristics are acquired from speech. Second, the characteristic of an audible system sensitive in a spectral region of above 1 kHz is compensated for to some extent. In PLP feature extraction, an equal-loudness curve, which indicates the frequency characteristics of the auditory organ, is directly used for modeling. The characteristic H(z) of the preemphasis filter is expressed by the following equation, where "a" uses a value in a range of 0.95 to 0.98.

$$H(z)=1-az^{-1}$$

A preemphasized signal is divided into block-based frames using a Hemming window. All subsequent processes are performed on a frame basis. The size of a frame is generally within a range of 20 to 30 ms, and a frame displacement of 10 ms is frequently used. The speech signal of a single frame is converted into that of a frequency domain using Fast Fourier Transform (FFT). A transform method other than the FFT, such as Discrete Fourier Transform (DFT), may be applied. A frequency band is divided into a plurality of filter banks, and energy for each bank is obtained. When a logarithm with respect to band energy is calculated and then Discrete Cosine Transform (DCT) is performed, final MFCCs are acquired. The shape of the filter banks and a method of setting the central frequency thereof are determined in consideration of the audible characteristics of the ear (the frequency characteristics of the cochlea). Twelve MFCCs ranging from c1 to c12 are used, frame log energy, which is separately obtained regardless of the MFCCs, is additionally used, so that the feature vectors used as an input signal for speech recognition become a thirteen order vector.

Linear Predictive Coding (LPC) represents speech samples as the combination of past speech samples. Furthermore, a prediction error that is obtained such that an original speech sample and a combined speech sample coincide is called LPC or an LPC coefficient.

A cepstrum is taken into a log scale after a feature vector is extracted using the LPC and the FFT The log scaling causes coefficients to be uniformly distributed such that coefficients, the scaling differences of which are small, have relatively large values, and coefficients, the scaling differences of which are large, have relatively small values. The result acquired through this is a cepstrum coefficient. Accordingly, an LPC cepstrum method uses LPC coefficients and causes the coefficients uniformly distributed using the cepstrum.

A method of obtaining a PLP cepstrum is described below. PLP analysis is performed in such a way as to perform filtering using the audible characteristics of human beings in a frequency domain, convert the filtering results into a self-correlated coefficient, and convert the self-correlated coefficient into a cepstrum coefficient. Audible characteristics sensitive to temporal variation in feature vector may be used.

Although the filter bank may be implemented in a time domain using a linear filter, the filter bank is generally implemented using a method of performing FFT on a speech signal, assigning weights to the magnitudes of coefficients corresponding to respective bands, and making summation.

The keyword model has eight mixtures and three to five states, and has 304 subwords. The number of monophones is 46, and the number of biphones is 258. Meanwhile, the filler model has eight mixtures and three to five states, 304 subwords, and 46 subwords in the case of monophones. The number of clusters based on the confidence scores is 121 on the basis of the states of the filler model.

In order to test the performance of an established speech recognition model, there was used a test specification in which 20 persons (10 men and 10 women) were made speak utterance, names, and place names. For parameter learning, 6289 words corresponding to IV, and 2496 words corresponding to OOV, were used. In a parameter test, 6296 words corresponding to IV, and 2497 words corresponding to OOV, were used.

Performance evaluation for the test was performed using an EER. The EER refers to performance evaluation that considers a False Alarm Rate (FAR), at which words are falsely recognized as IV, and a False Rejection Rate (FRR), at which words are falsely recognized as OOV, to be the same.

Figure 8:
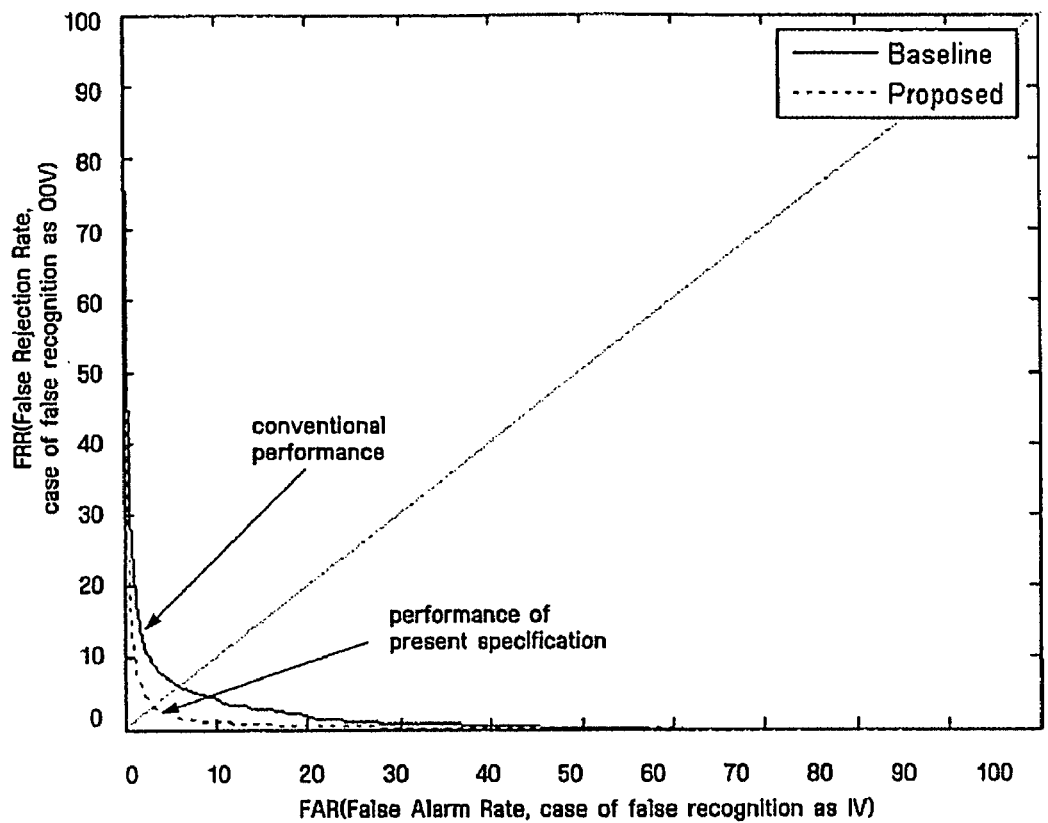
FIG. 8 is a graph showing improved performance according to an embodiment of the present invention.
Figure 9:
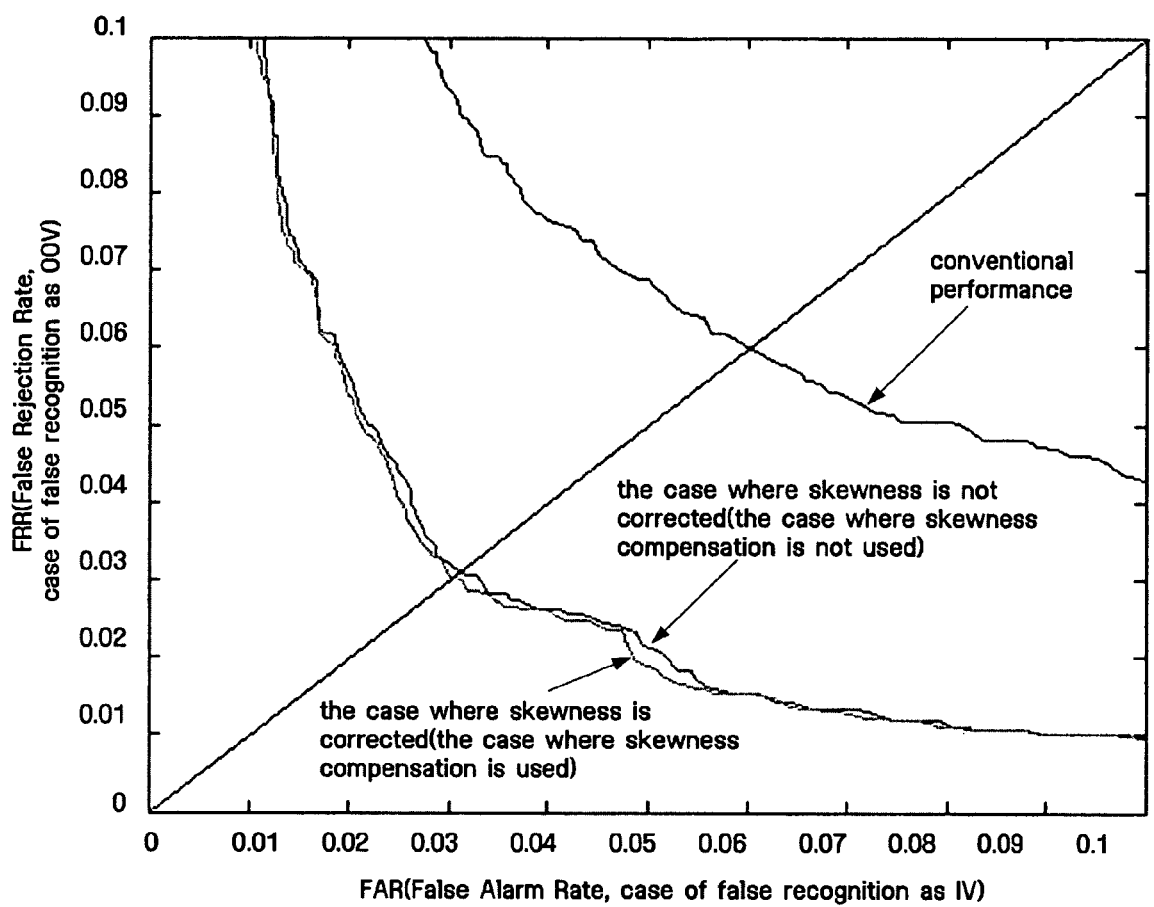
FIG. 9 is a graph showing improved performance when skewness correction is performed according to an embodiment of the present invention.

FIG. 8 is a graph showing improved performance according to an embodiment of the present invention. An EER, at which an FAR and an FRR are equal to each other, is 6.08% when a conventional method is used. In contrast, an EER is 3.11% when the method proposed in the present specification is used. Accordingly, it can be seen that an error rate is reduced by 48.8%. FIG. 9 illustrates an example in which the effect of skewness correction is shown.

FIG. 9 is a graph showing improved performance when skewness correction is performed according to an embodiment of the present invention. When the skewness correction is performed, an EER is 3.02%. Accordingly, it can be seen that the error generation rate of the present invention is reduced by 50.3% compared to that of a conventional method, the performance of which is 6.08%. Meanwhile, in FIG. 9, the case where skewness correction is performed shows a performance increase of about 0.09% compared to the case where skewness correction is not performed.

The present invention can improve the confidence of speech recognition by measuring the confidence levels of respective frames.

Furthermore, the present invention can reduce the Equal Error Rate (EER) of a speech recognizer by correcting calculation results on confidence levels with weights assigned to respective frames Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of recognizing speech by measuring confidence levels of respective frames, the method comprising:
   obtaining frequency features of a received speech signal for the respective frames having a predetermined length;
   calculating a keyword model-based likelihood and a filler model-based likelihood for each of the frames;
   calculating confidence scores based on the two types of likelihoods for each of the frames;
   transforming the confidence scores by applying transform functions of clusters, which include the confidence scores or are close to the confidence scores, to the confidence scores; and
   deciding whether the received speech signal corresponds to a keyword or a non-keyword based on a combination of confidence scores of each frame,
   wherein the frames constitute a subword, and
   wherein the deciding comprises the operation of calculating skewness of a distribution of the confidence scores and correcting the confidence scores through an operation of subtracting a result, which is acquired by multiplying the calculated skewness by a constant, from the confidence scores.

2. The method as claimed in claim 1, wherein the clusters are classified according to the confidence scores of the each frame.

3. The method as claimed in claim 1, wherein each of the frames is a frame, part of which overlaps another frame.

4. The method as claimed in claim 1, wherein the frames correspond to one or more states that constitute a subword.

5. The method as claimed in claim 1, wherein the calculation of the keyword comprises the operation of calculating the keyword model-based likelihood or the filler model-based likelihood as a result of the feature extraction from each of the frames acquired by dividing the speech signal by a predetermined size.

6. The method as claimed in claim 5, wherein the feature extraction uses any one of a Linear Prediction Coefficient (LPC) cepstrum, a perceptual Linear Prediction (PLP) cepstrum, and a filter bank.

7. The method as claimed in claim 1, wherein the keyword model-based likelihood is calculated through a Viterbi decoder.

8. An apparatus to recognize speech by measuring confidence levels of respective frames, the apparatus comprising:
   a speech recognition unit to recognize speech;
   a confidence measurement unit to measure a value of a confidence score of respective frames, and to transform the confidence scores by applying transform functions of the clusters to the confidence scores, wherein the frames constitute a subword; and a decision unit to decide whether a received speech signal is a keyword or a non-keyword, based on confidence scores calculated using keyword model-based likelihoods and filler model-based likelihoods, wherein the decision unit calculates skewness of a distribution of the confidence scores and corrects the confidence scores by subtracting a result, which is acquired by multiplying the calculated skewness by a constant, from the confidence scores.

9. The apparatus as claimed in claim 8, the speech recognition unit further comprising:
   a keyword modeling unit to calculate the keyword model-based likelihoods using frame-based feature vectors of the received speech signal, and
   a filler modeling unit to calculate the filler model-based likelihoods using the frame-based feature vectors.

10. The apparatus as claimed in claim 8, wherein the confidence measurement unit further comprising:
   a frame-based LR (Likelihood Ratio) calculation unit to calculate a LR; and
   a cluster selection unit configured to have clusters which classify the distribution ranges of the confidence scores, and provide information about clusters closest to the confidence scores.

11. The apparatus as claimed in claim 8, wherein the clusters are classified according to the confidence scores of the each frame.

12. The apparatus as claimed in claim 8, wherein each of the frames is a frame, part of which overlaps another frame.

13. The apparatus as claimed in claim 8, wherein the frames correspond to one or more states that constitute a subword.

14. The apparatus as claimed in claim 8, further comprising a feature extraction unit for extracting features from the respective frames acquired by dividing the speech signal by a predetermined size;
   wherein the keyword model unit or the filler model unit calculates likelihoods using the extracted features.

15. The apparatus as claimed in claim 14, wherein the feature extraction uses any one of an MFCC, an LPC cepstrum, a PLP cepstrum, and a filter bank.

16. The apparatus as claimed in claim 9, wherein the keyword modeling unit comprises a Viterbi decoder and a keyword database.

17. The apparatus as claimed in claim 9, wherein the filler modeling unit comprises a monophone filler network, a biphone filler network, and/or a triphone filler network.

* * * * *

UNITED STATES PATENT AND TRADEMARK OFFICE
CERTIFICATE OF CORRECTION

PATENT NO. : 8,271,283 B2  
APPLICATION NO. : 11/355082  
DATED : September 18, 2012  
INVENTOR(S) : Jae-hoon Jeong et al.

Page 1 of 1

It is certified that error appears in the above-identified patent and that said Letters Patent is hereby corrected as shown below:

In the Claims:

Column 10; Line 55; In claim 6, delete "perceptual" and insert -- Perceptual --, therefor.

Signed and Sealed this  
Seventh Day of May, 2013

Teresa Stanek Rea  
*Acting Director of the United States Patent and Trademark Office*